US 6,647,420 B2

(12) United States Patent
Hellbusch et al.

(10) Patent No.: US 6,647,420 B2
(45) Date of Patent: Nov. 11, 2003

(54) ENTERLINK FOR PROVIDING A FEDERATED BUSINESS TO BUSINESS SYSTEM THAT INTERCONNECTS APPLICATIONS OF MULTIPLE COMPANIES

(75) Inventors: Mark H. Hellbusch, Beavercreek, OH (US); Bryon K. Propst, Centerville, OH (US); Girish U. Balsavar, Centerville, OH (US)

(73) Assignee: Reynolds and Reynolds Holdings, Inc., Moraine, OH (US)

( * ) Notice: Subject to any disclaimer, the term of this patent is extended or adjusted under 35 U.S.C. 154(b) by 499 days.

(21) Appl. No.: 09/761,834

(22) Filed: Jan. 18, 2001

(65) Prior Publication Data

US 2002/0095321 A1 Jul. 18, 2002

(51) Int. Cl.[7] .............................................. G06F 15/173
(52) U.S. Cl. ........................ 709/226; 709/223; 709/229
(58) Field of Search ................................ 709/223, 226, 709/229

(56) References Cited

U.S. PATENT DOCUMENTS

| | | | |
|---|---|---|---|
| 6,115,690 A | * | 9/2000 | Wong ............................ 705/7 |
| 6,125,391 A | * | 9/2000 | Meltzer et al. .............. 709/223 |
| 6,351,738 B1 | * | 2/2002 | Clark ........................... 705/37 |
| 6,496,861 B1 | * | 12/2002 | Sevcik ......................... 709/224 |
| 6,519,642 B1 | * | 2/2003 | Olsen et al. ................. 709/227 |
| 6,584,507 B1 | * | 6/2003 | Bradley et al. ............. 709/229 |
| 6,587,827 B1 | * | 7/2003 | Hennig et al. ................. 705/1 |

* cited by examiner

Primary Examiner—Saleh Najjar
(74) Attorney, Agent, or Firm—Kirkpatrick & Lockhart LLP; Stephen C. Glazier

(57) ABSTRACT

The present invention, sometimes called Enterlink, for the first time provides a federated system with state that interconnects applications of multiple companies. The Enterlink connects participant companies and applications, through the Enterlink bus, with each other and with consolidated data stores, third party services, core services, public process applications, and private process applications. The Enterlink bus uses, for the first time, metachannels, a metachannel engine and a metachannel repository. Connectors connect the Enterlink public process applications and the company private process applications with the bus. The invention can be applied to the automotive retail industry, among others. The Enterlink applications, core applications, and bus, may be operated as a service to company participants.

25 Claims, 8 Drawing Sheets

Enterlink Topology

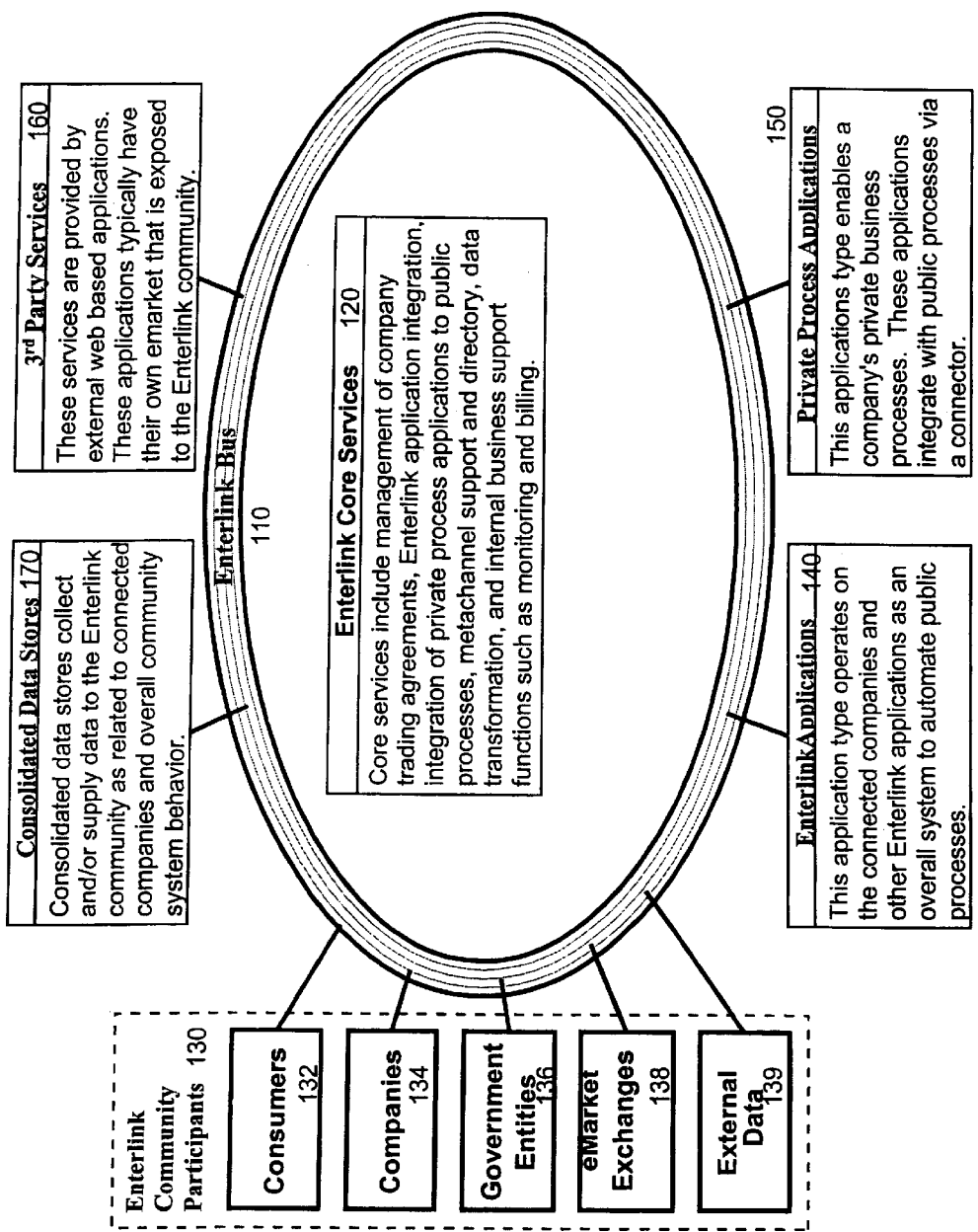
Figure 1: Enterlink Topology

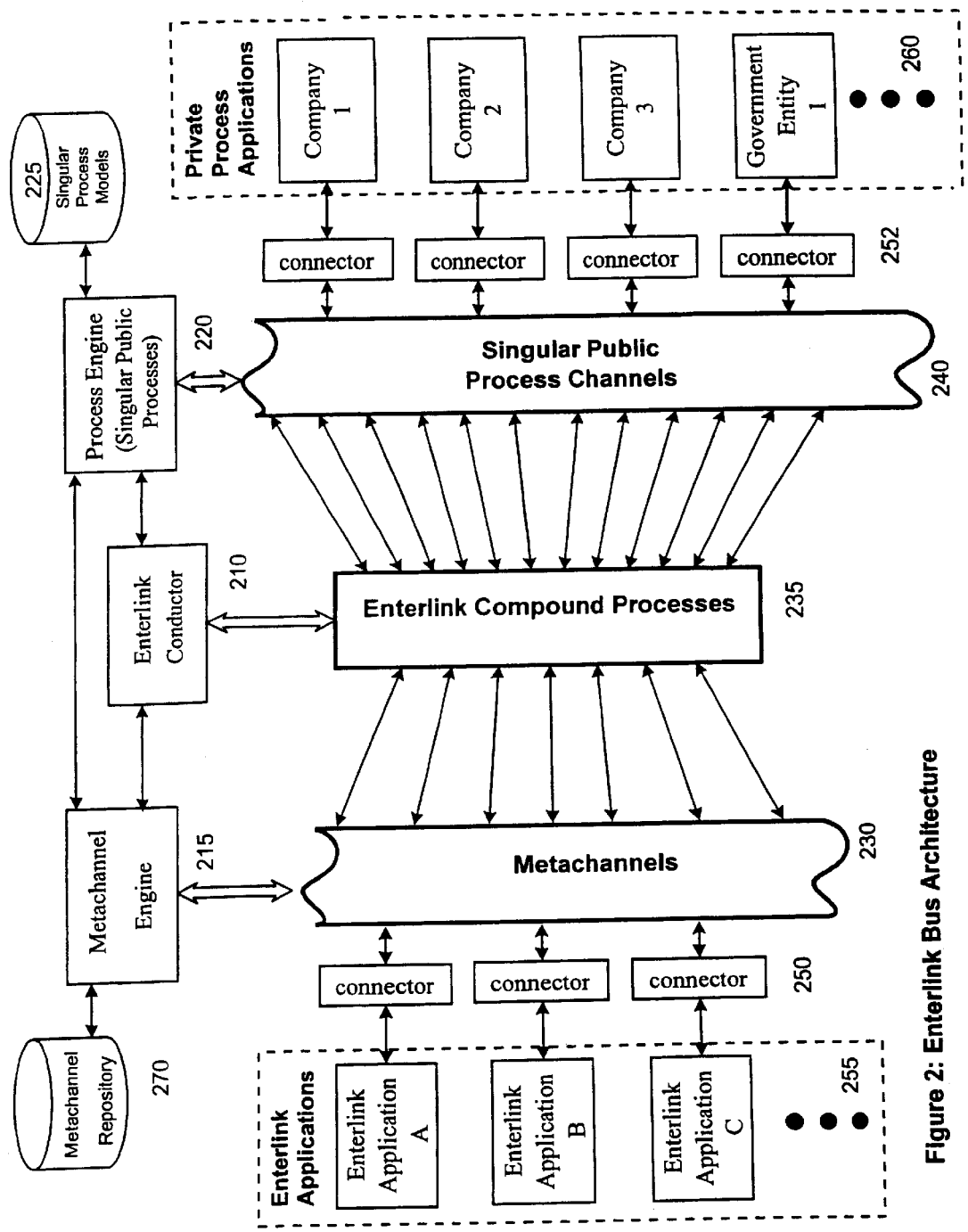
Figure 2: Enterlink Bus Architecture

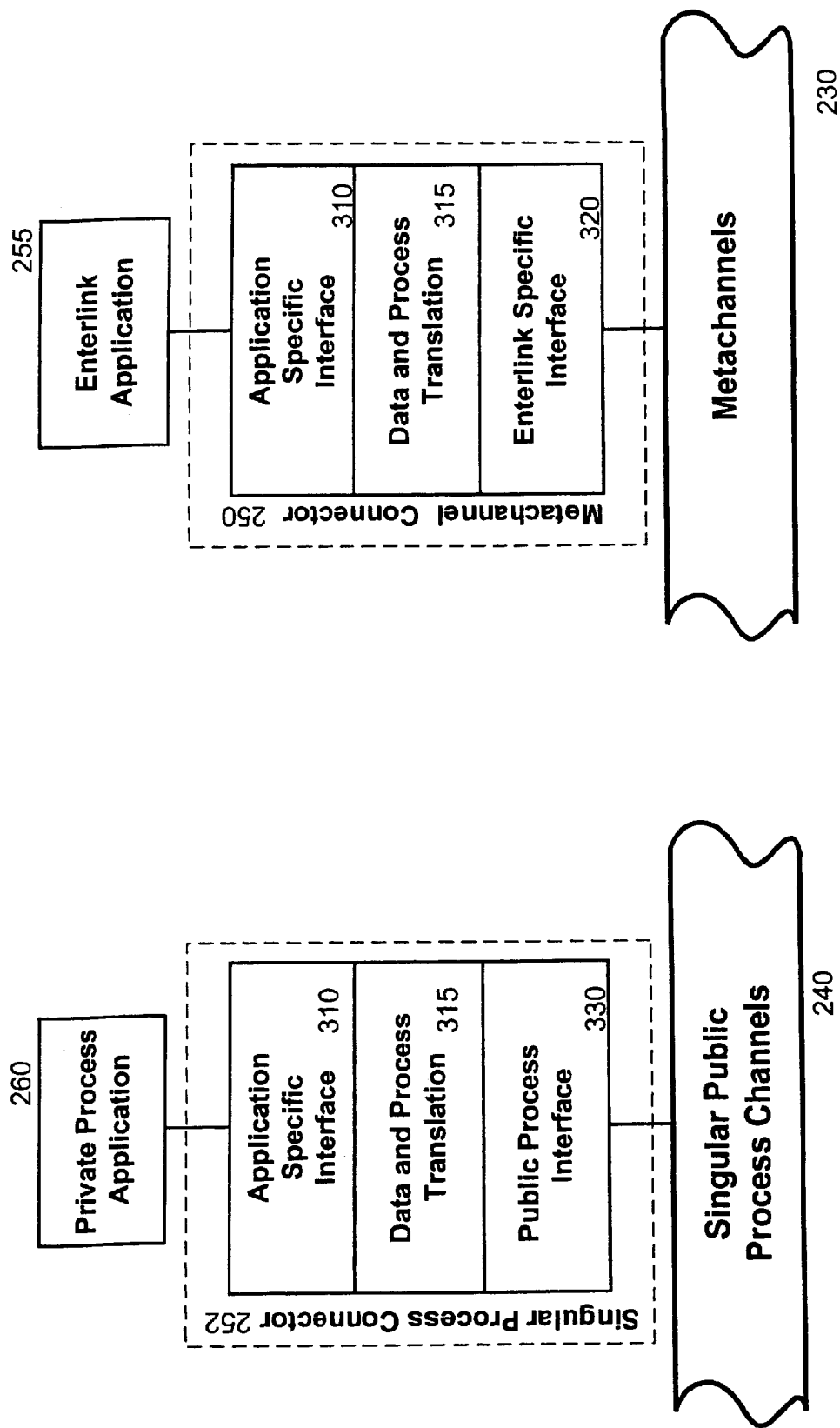
Figure 3: Enterlink Connector Architecture

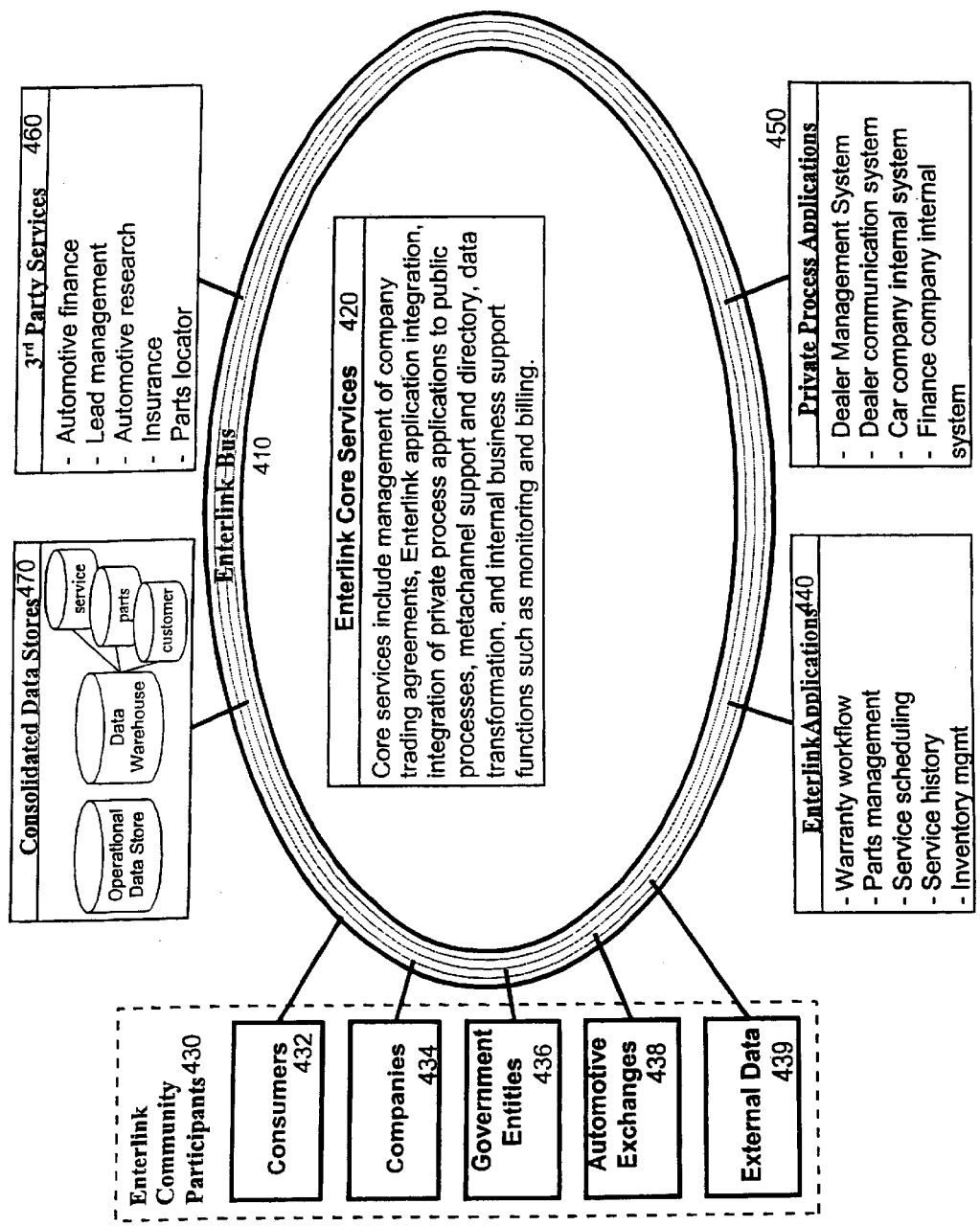
Figure 4: Enterlink Topology - Automotive Retail Example

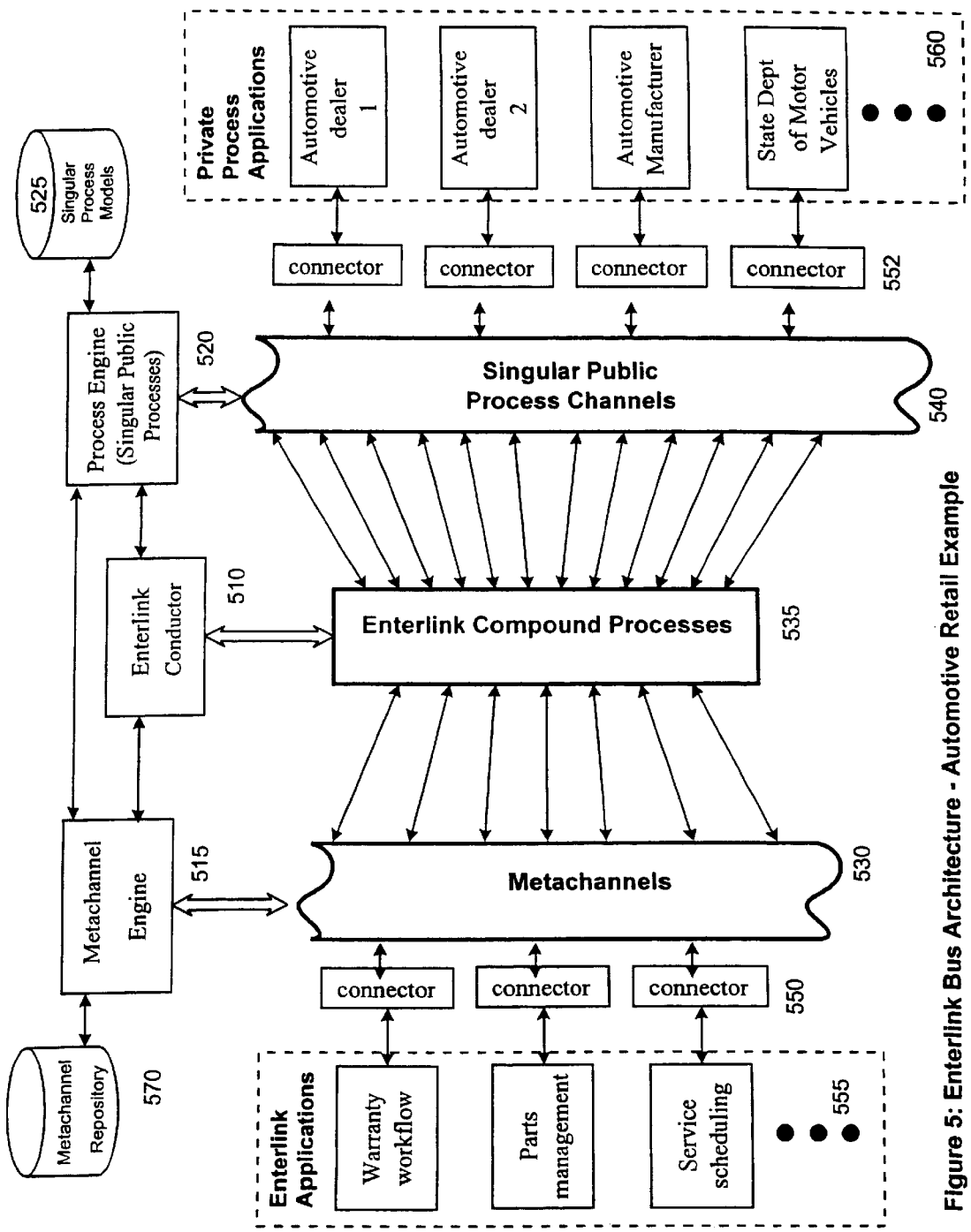
Figure 5: Enterlink Bus Architecture - Automotive Retail Example

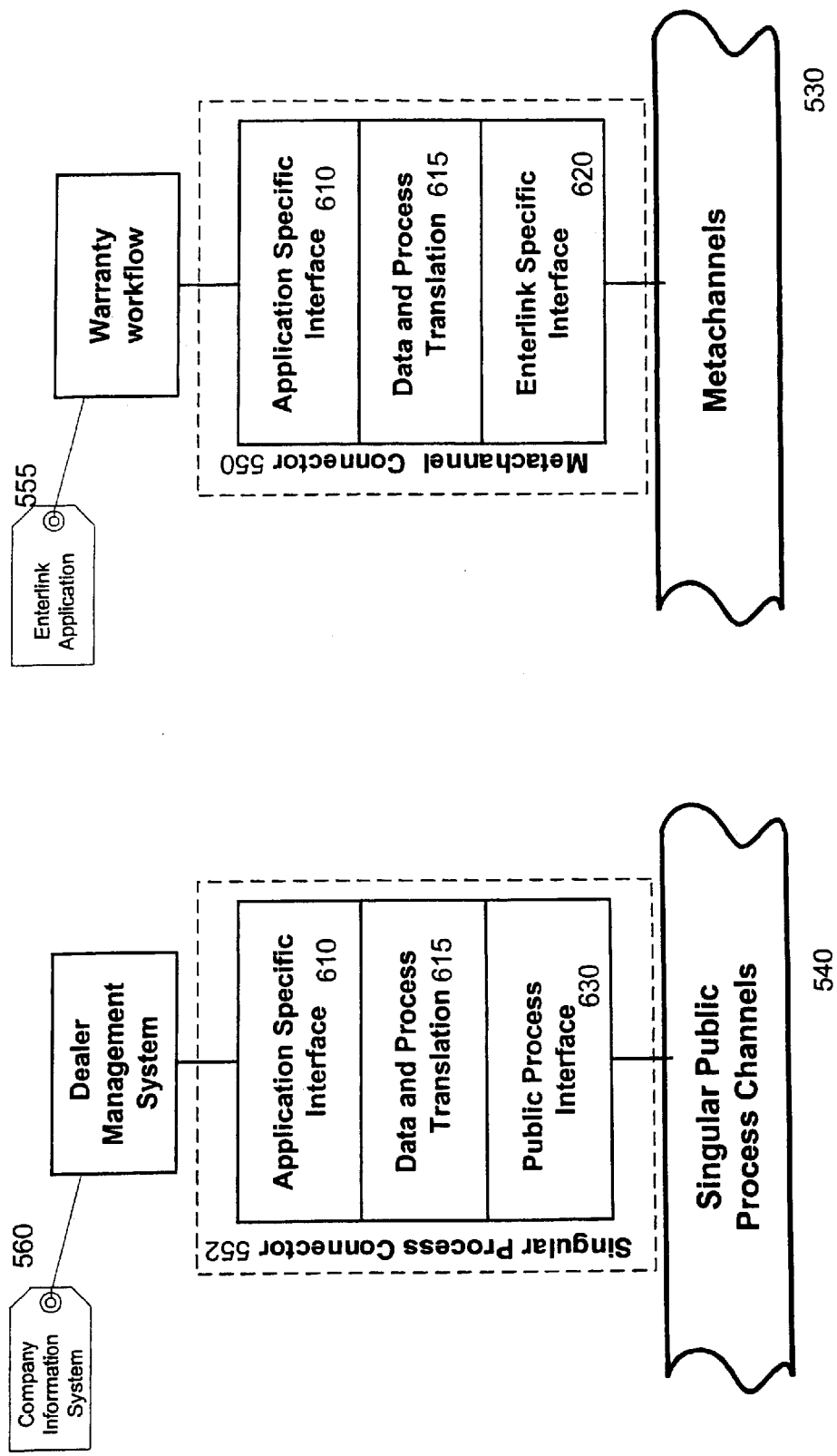
Figure 6: Enterlink Connector Architecture - Automotive Retail Example

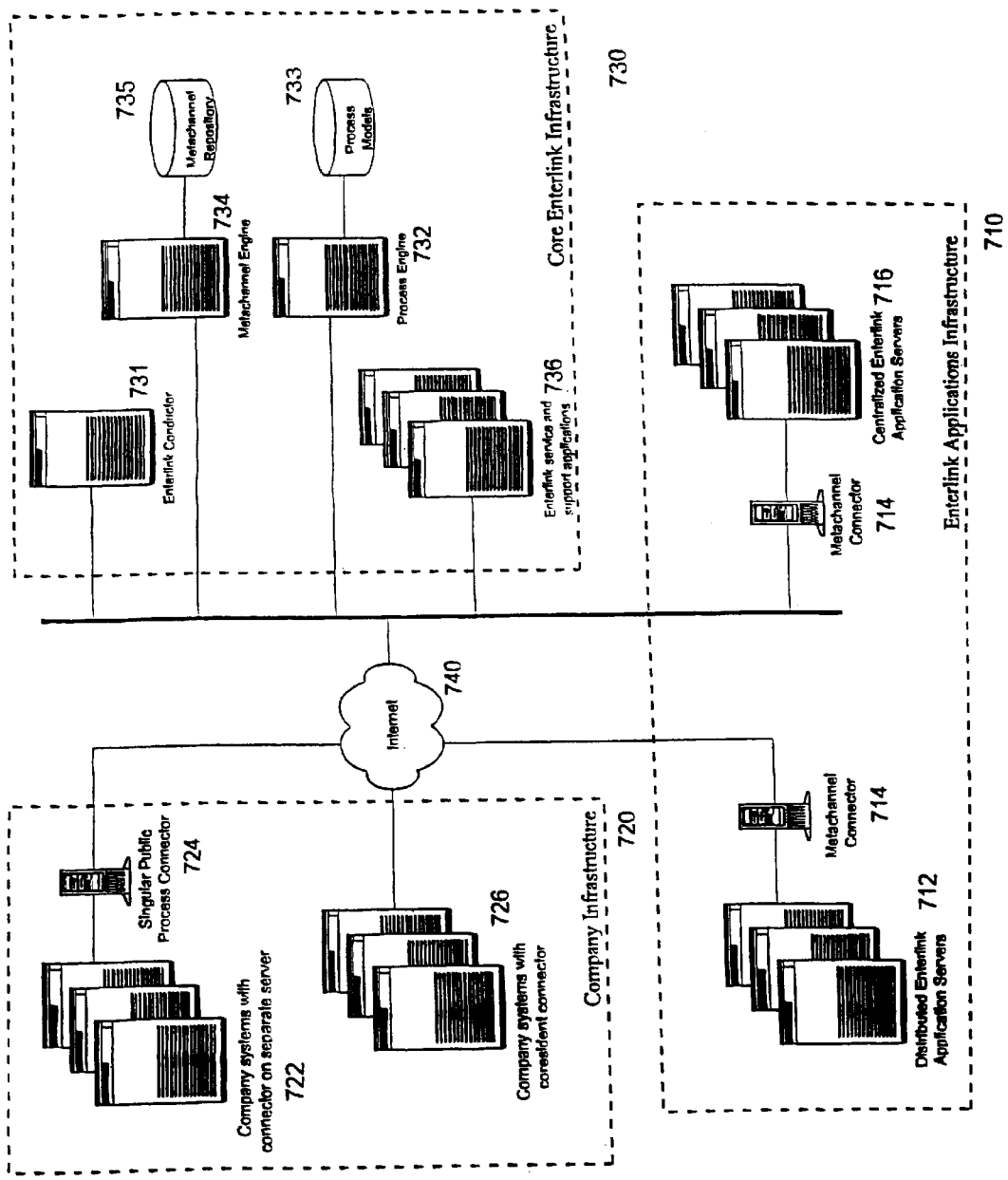
Figure 7: Simplified Enterlink Infrastructure Example

Figure 8: Core Enterlink Services

ENTERLINK FOR PROVIDING A FEDERATED BUSINESS TO BUSINESS SYSTEM THAT INTERCONNECTS APPLICATIONS OF MULTIPLE COMPANIES

FIELD OF THE INVENTION

This invention relates to data, software, and computer system architecture. Specifically, this invention relates to a data, software, and computer system architecture that interconnects applications of multiple enterprises into a single federated system.

BACKGROUND OF THE INVENTION

Electronic communication among enterprises such as vendors and suppliers is currently accomplished through networks, including private networks and through public networks, such as the Internet. A participant in the network establishes a connection to the network, and is thus able to transmit a communication, such as an electronic message, to another participant in the data network. The data network delivers the communication from the source participant to the destination participant.

The primary alternative used today for connecting enterprises into a network is a combination of centralized and distributed architectures. A centralized architecture is characterized by a central node, or hub, through which all communications pass. A distributed architecture, on the other hand, provides multiple hubs through which electronic communication may be routed, instead of using a single, central hub. However, whether an architecture is centralized or distributed, the current methods for connecting enterprises suffer from the inability to maintain the overall state of the network.

Without the overall state being maintained, each company or centralized application would have to maintain state independently. A company, for example, would have to determine whether its connectivity to its supplier is operational before initiating any electronic communication with the supplier. For this to be accomplished, every company and application would have to connect directly with every other company and application. This connectivity approach is not feasible for industry segments with many companies and applications.

In addition, none of the existing system architectures provides a means to integrate process activities. With a centralized application, all processing occurs at the centralized application. A centralized system can conduct an overall or end-to-end business process, but needs to own the singular public processes as well. Thus, there is no inherent means to integrate process activities contained in other applications with the centralized applications. On the other hand, distributed systems allow several companies to conduct singular public processes. However, with distributed systems, not only is there a lack of any means to integrate process activities together, but greater complexity arises from the need to automate multiple company processes into an overall process.

SUMMARY OF THE INVENTION

The present invention, sometimes called Enterlink, for the first time provides a federated system with state that interconnects applications 150 of multiple community participants 130 with Enterlink applications 140 and core services 120. The Enterlink connects participant companies 130 and applications 150, 140, through the Enterlink bus 110, with each other and with consolidated data stores 170, third party services 160, core services 120, Enterlink applications 140, and private process applications 150. The Enterlink bus 110 uses, for the first time, metachannels 230, a metachannel engine 215 and a metachannel repository 270. Metachannel connectors 250 connect the Enterlink applications 255, 140 with the metachannel 230, while singular process connectors 252 connect the company private process applications 150, 260 with the singular public process channels 240. The invention can be applied to the automotive retail industry 430, among others. The Enterlink applications 140, core services 120, and bus 110, may be operated as a service to participants 130.

The present invention, for the first time, allows companies to own and control singular business processes while also allowing a centralized capability to link these processes into a compound public process. The division of ownership and the control inherent in the Enterlink create a federated system that provide local autonomy to companies for specific public business processes while allowing central management to tie together singular processes into compound processes.

Enterlink, for the first time, creates an overall federated system that has state. As a result, Enterlink provides applications with the capability to operate on the collection of companies and other Enterlink applications as an overall federated system. Furthermore, Enterlink extends the current point-to-point public processes from one-to-one to many-to-many. This allows far more automation of business-to-business interactions than is presently possible. In addition, Enterlink also provides a framework for implementing compound public processes, thus overcoming the disadvantages of the current public business-to-business processes that are only focused on a singular business activity.

Compared to point-to-point interactions, the present invention reduces the number of connections from [n (n−1)/2] to [n], where "n" is the number of participants. This substantially reduces the amount of effort for a large community to conduct business. That is, to participate in a point-to-point system, each company must establish a one-to-one relationship with each other company. But in this invention, a participant need only establish a business relationship with the Enterlink system pursuant to its rules. For example, a business-to-business environment with 100 companies needing to conduct business yields in a point-to-point system 100(100−1)/2=4950 business relationships. The same 100 companies in an Enterlink system yields only 100 business relationships For a business-to-business environment like the retail automotive industry, with an assumed population of 100,000 companies, interconnecting these 100,000 companies yields in a point-to-point system, 100,000(100,000−1)/2=4,999,950,000 business relationships. But in an Enterlink system this participant population yields only 100,000 business relationships.

This invention, for the first time, creates a federated system that interlinks multiple company business processes together and allows applications to interact with these processes, through the Enterlink topology. The Enterlink topology is a bus structure where each company has a connection to the bus that enables that company to interact with other companies connected to the bus. Thus, an Enterlink application can integrate with the Enterlink to automate a federated system activity.

Two main components of the invention are (1) the Enterlink (including the bus 110, core services 120, consolidated data stores 170, third party services 160, and Enterlink applications 140), and (2) the interface or connectors 250, 252 needed to integrate each private process application 260, and each Enterlink application 140, to the Enterlink.

The invention will operate on public processes. As a result, the present invention is different from current public process environments in at least two aspects. First, the present invention provides for establishing a connection between the Enterlink and each of a plurality of companies, instead of each of the companies establishing a singular process with each other company. The Enterlink would, in turn, support singular processes as well as compound processes.

Second, the present invention provides a means to connect multiple entities while also maintaining the state of the federated system. Without the Enterlink, each application is designed to be either distributed or centralized and has to deal with connections and state maintenance. With the Enterlink capability, an application only needs a connector to the Enterlink, and lets the Enterlink maintain state as well as supply process connectivity to all the other Enterlink applications and connected company applications.

This invention may use features described in (1) Provisional Application No. 60/176,625, "Performance Path Method and Apparatus For Exchanging Data Among Systems Using Different Data Formats," incorporated in its entirety herein by this reference, filed on Jan. 19, 2000, by Robert G. Schaefer and Harsh Wardhan, and assigned to Reynolds and Reynolds Holdings, Inc. of Dayton, Ohio, and (2) U.S. patent application Ser. No. 09/741,008, "Performance Path Method and Apparatus For Exchanging Data Among Systems Using Different Data Formats," incorporated herein in its entirety by this referenced, filed Dec. 21, 2000, by Robert G. Schaefer and Harsh Wardhan, and assigned to Reynolds and Reynolds Holdings, Inc. of Dayton, Ohio.

BRIEF DESCRIPTION OF THE DRAWINGS

FIG. 1 illustrates the Enterlink topology according to the present invention.

FIG. 2 illustrates the Enterlink Bus architecture according to the present invention.

FIG. 3 illustrates the connector architecture according to the present invention.

FIG. 4 shows companies and applications that are connected to the Enterlink to form an overall federated system for the automotive retail industry according to the present invention.

FIG. 5 shows the Enterlink bus architecture for the federated system in FIG. 4.

FIG. 6 illustrates connections for a company's information system and an Enterlink application according to the present invention.

FIG. 7 shows a highly simplified example of the infrastructure for the core Enterlink, companies, and Enterlink applications.

FIG. 8 shows the core Enterlink services.

DETAILED DESCRIPTION OF THE DRAWINGS

Definitions

The following definitions of terms are used throughout this document:
  A private process refers to a company's internal business process. An example of a private process is a company's credit approval process for an order.

A public process refers to a process that spans two or more companies.

A singular process refers to a public process that performs one business function between two companies. Two examples of singular public processes are ordering an item and billing for that item.

A compound process refers to a public process that contains two or more singular processes. This type of process links together several singular processes to support an overall business process or model. A compound process, for example, may link together several singular processes such as to order an item, bill for that item, and collect payment for the item.

A message contains a signal that causes an activity to be started or stopped. In most cases, it also contains data. An example of a message is receiving a purchase order that lists two items being purchased.

A channel is usually a physical construct (i.e., a physical channel) that messages are written to and subsequently read from. Channels can be structured and formatted by a number of dimensions depending on the goals of the application. For example, continuing to build on previous examples, two channels could be defined: (1) an order channel, for all messages related to orders, and (2) a brand order channel for all messages related to orders and a particular brand.

Connectors are software constructs used by companies and Enterlink applications to facilitate channel reading and writing interactions.

A metachannel is a logical representation of Enterlink compound processes, and serves a similar purpose as a channel, where messages are written to and read from. In addition, a metachannel is connected to applications through the use of connectors to facilitate writing and reading to the metachannel. The metachannel also creates an encapsulated set of channels based on compound processes. These encapsulated channels allow reuse and sharing of business-to-business processes while providing varying degrees of interoperability and separation.

Enterlink Core Services (also called core services) may include management of company trading agreements, Enterlink application integration, integration of private process applications to public processes, metachannel support and directory, data transformation, and internal business support functions such as monitoring and billing.

Enterlink Applications (also called public process applications) operate on the connected companies and other Enterlink applications as an overall system to automate public processes.

Private process applications are applications that enable a company's private business processes. These applications integrate with public processes via a connector.

Consolidated data stores collect and/or supply data to the Enterlink community as related to connected companies and overall community system behavior.

Third Party Services are provided by external web based applications. These applications typically have their own electronic markets that are exposed to the Enterlink community.

The Figures

FIG. 1 shows the Enterlink topology. FIG. 4 is a specific embodiment of the Enterlink topology, applied to the retail automotive industry. The Enterlink topology has a bus structure 110 where each company 130 has a connection to the bus 110 that enables that company to interact with other companies connected to the bus.

The bus 110 provides an outward facing integration mechanism for the underlying components of the system. The bus 110 integrates the system's services, data and workflow.

A. Enterlink Domains

The elements in the Enterlink architecture shown in FIG. 1 and FIG. 4 may include a bus 110, 410, connecting core services 120, 420, private process applications 150, 450, consolidated data stores 170, 470, Enterlink applications (also called public process applications) 140, 440, third party services 160, 460 and Enterlink community participants 130, 430.

1. Private Process Applications 150

Private process, or localized, applications 150 are specific to a single company or participants 130. They are a collection of systems that automate a company's business processes. In general, there are two types of applications: 1) operational applications that execute day-to-day functions and tend to be on-line transaction processing (OLTP) systems, and 2) analytical applications that enable decision support and tend to be on-line analytical processing (OLAP) systems. Within this domain, operational and analytical applications can be joined to provide a means for the analytical intelligence to affect the day-to-day operations.

2. Consolidated Data Stores 170

The consolidated data stores 170 consist of two groups. The first is an operational data store (ODS) that replicates data between the operational public process applications 140 and localized applications. The second is a data warehouse that consists of multiple data marts organized either by subject areas (e.g., parts) or by another dimension such as a participant 130 (e.g., Ford).

The ODS gives an integrated view of the private process application 150 and public process applications 140 operational systems. It contains current data, rather than housing historical data like a data warehouse. This ODS has some similarities to a traditional enterprise ODS, but also has some significant differences. Similarities include moving the data and augmenting the data model to account for having multiple operational systems grouped together. A significant difference is dealing with differing groups of multiple systems of private processes 150, and creating a neutral representation (e.g., storing both ERA 2 data, based on the ERA 2 product developed by Reynolds and Reynolds, Inc. of Dayton, Ohio, and data from competing systems by other vendors). Therefore, another difference is that there is a looser relationship between the consolidated data store and the source systems.

The data warehouse creates a historical perspective of the same data that is moved to the ODS. The preferred architecture uses the same data movement and cleansing tools for both. The proposed architecture is a federated model having a centralized data warehouse that brings order and control to the numerous data marts. The data warehouse/marts will be the primary data store for the Enterlink (or public process) applications 140.

3. Enterlink Applications (Public Process Applications) 140

Enterlink applications (also known as public process applications) 140 work in the context of the overall business and consumer community enabled by the Enterlink. These Enterlink applications 140 operate on the overall community to automate business-to-business interactions between two or more companies.

Enterlink applications 140 are a new type of application for performing public processes. Currently, there are two other approaches used to perform public processes. One is to deploy an application at each company that wants to participate in a public process. This approach has the disadvantage of requiring a very large proliferation of installed applications and does not allow for compound public processes. The number of installed applications is proportional to the number of applications times the number of companies. The other approach is to set-up a separate legal entity, and companies that need that legal entity's services implement a point-to-point connection. This approach has two disadvantages: 1) while reducing the number of installed applications, the amount of effort still grows in proportion to the number of companies times the number of applications due to the point-to-point architecture; and 2) there is no inherent ability to link two or more applications together to enable compound public processes.

Enterlink applications 140, along with the Enterlink, do not have these disadvantages. An Enterlink application 140 only has one connection to the community participants 130. Additionally, Enterlink applications 140 can interact with a company's private process applications 150 as well as other Enterlink applications 140 to create feature rich compound process solutions. Furthermore, in the case where an eMarket exchange 138 is connected with the Enterlink, Enterlink applications 140 can also interact with these external applications and automate interactions between the Enterlink community participants 130 and the eMarket exchange 138.

4. Third Party Services 160

The Third Party Services 160 domain provides support of eBusiness-to-eBusiness processes for the community participants 130. These services work in concert with the private process applications 150 and public process applications 140. Examples of Third Party Services 160 are web-based automotive finance services, web-based lead management, collision repair, insurance, and payroll/human resources services.

5. Enterlink Community Participants 130

For descriptive purposes, the community participants 130 can be grouped into three sets: 1) consumers 132; 2) companies 134, government entities 136, and eMarket exchanges 138; and 3) external data 139.

First, consumers 132 only indirectly interact with the Enterlink. The Enterlink provides the ability to automate interactions between applications 140, 150 that enable private and public processes. Consumers 132 are defined as end users of the services that these applications 140, 150 and processes provide. As a result, the consumer 132 benefits directly from seamless services that span multiple companies rather than having to interface with multiple legal entities. In addition, given the inherent capability of the Enterlink to maintain state, the consumer 132 can be relieved of having to repeatedly reenter the same information as the consumer's 132 interaction moves from one community member to the next (e.g., from a company 134 to a government entity 136). Another key advantage of the indirect relationship between the consumer 132 and the Enterlink is that the Enterlink does not interfere in the relationship between a business and its end customer. Rather, the Enterlink allows a business to have a better relationship and provide better services to its customers.

Companies 134, government entities 136, and eMarket exchanges 138, for purposes of this discussion, are "businesses" that participate in a web of services. These businesses typically have private processes that need to integrate with public processes. The Enterlink supplies this integration. In addition to interacting with other businesses, the businesses also interact with Enterlink applications 140 to enable compound public processes.

External data 139 is a unique participant. External data 139 can be viewed as a data supplier and/or a data consumer. In the case of external data as a data supplier, the Enterlink community would take in this data and use it to add value to applications and processes. In the case of external data as a data consumer, information can be made available in two forms. One form is data supplied by one or more Enterlink businesses, while another form is data about the behavior of the Enterlink federated system.

B. Enterlink Bus Architecture

FIG. 2 illustrates the details of Enterlink bus architecture 110 of the topology depicted on FIG. 1. Physically, the bus 110 is a distributed collection of connectors 250, 252 in which the connectors 250, 252 coordinate their activities together as a whole. Depending on the need, the connectors 250, 252 may be distributed among systems that reside in one room, or they may be geographically dispersed. Also, depending on design considerations, a connector software may co-reside on the system being interfaced to Enterlink or be consolidated on separate infrastructures. The connectors 250, 252 are networked together so that any connector can communicate with any other connector. Ideally, the connectors 250, 252 are self-describing and can each be added and subtracted without modifying or interrupting service from the other connectors 250, 252.

Logically, the connectors 250, 252 create a bus 110 comprised of metachannels 230 and channels 240 that organize similar objects into groups. A hierarchy of channels 240 may also be defined. For example, a parts channel can be defined that is partitioned by vehicle make. The connectors 250, 252, metachannels 230, and channels 240 also provide the security mechanisms needed to simultaneously support Enterlink processes on the same physical bus infrastructure, while enforcing well-defined separation.

The bus architecture 110 is federated to encompass processes and applications 140, 150 that are common among global enterprises. One logical bus may be deployed for a specific geographic region, while another logical bus may be deployed for a second geographic region. A central logical bus will then integrate the two geographically-distinct logical buses together, thus creating a federated system in which three logical buses are working in concert as a whole.

As shown on FIG. 2, the Enterlink bus architecture 110 has several key architectural components.

1. Metachannels 230

As defined in this document, a metachannel 230 is a logical representation of Enterlink compound processes. The metachannel 230 is an application program interface (API) or service layer that interacts with Enterlink applications 255 through connectors 250. In addition, the metachannel 230 interacts with the metachannel engine 215 to control the flow of information between the metachannel 230, the Enterlink compound processes 235, and the connectors 250.

The metachannel is the mechanism that provides the ability for Enterlink applications 255 and private process applications 260 to work with the compound processes 235. The metachannel is unique because it provides the ability to work with two or more singular processes. In addition, unlike in an enterprise channel, a metachannel provides the ability to interconnect competing and cooperation companies together, while providing the necessary isolation and security for each participating company. To do this, the metachannel implements a set of rules that are built around relationships among the Enterlink participants, and the rules are stored in the metachannel repository 270.

2. Enterlink Compound Processes 235

The Enterlink compound processes 235 interact with the metachannels 230 through messages. The Enterlink applications 255 initiate messages through the connectors 250 to the metachannel 230, and the messages are transmitted by the metachannel 230 to the Enterlink compound processes 235. The Enterlink compound processes 235 aggregate and disaggregate the messages based on logical rules that are provided by the Enterlink conductor 210.

Similarly, the Enterlink compound processes 235 interact with the singular public process channels 240 through messages. For example, a singular public process channel 240 may transmit a message to the Enterlink compound process 235 to initiate an order for parts. The Enterlink compound process 235 processes the message based on logical rules provided by the Enterlink conductor 210, and may determine that the parts order will trigger one or more messages, such as a message to negotiate the price, a message to ship the parts, and a message to bill the company that initiated the parts order.

3. Singular Public Process Channels 240

A channel 240 is a physical construct used to write and read messages. The behavior of the channel 240 is similar to a queue where messages are put into a queue and subsequently taken out of the queue. The channel 240 differs from a queue in the manner that messages are taken out of the queue. The channel 240 supports multiple, simultaneous reads of the message. The channel 240 also contains the intelligence to know how many readers there are and controls when the message is deleted, typically when all the authorized readers have gotten the message. In addition, the channel 240 can be multi-threaded in allowing readers to be reading differing messages in the "queue". This occurs when one reader processes a message faster than another reader.

4. Process Engine 220 and Metachannel Engine 215

The process engine 220 and metachannel engine 215 are based on current Enterprise Application Integration (EAI) software and Business-to-Business (B2B) integration software. EAI technology typically is utilized in automating private processes. B2B integration technology typically is utilized to automate a given enterprise's interaction with a public process 140. In general, there are four types of interaction models: publish/subscribe, request/reply, send/receive, and conversational. Unlike EAI and B2B integration technologies, the process engine 220 and metachannel engine 215 operate on either singular or compound public processes 140 instead of private processes 150.

A process engine 220 contains a repository of the public process models. The process engine 220 carries out the steps in a process model 225 and interacts with channels 240 to facilitate movement of messages between process steps. The process engine 220 also interacts with a company's private applications 260 to execute functionality as required at each process step.

Similarly, the metachannel engine 215 contains a metachannel repository 270 of the process services available to each Enterlink application 255. The metachannel engine 215 controls the interactions with the metachannels 230.

The preferred embodiment of the metachannel engine 215 uses object oriented development technologies (e.g., OOA, OOD, and languages). In this preferred embodiment, all operational behavior is driven by configurations. In addition, in the preferred embodiment, the metachannel engine 215 is designed to support multiple, distributed metachannel engines 215 that are required for scaling and geographic location considerations.

5. Enterlink Conductor 210

The Enterlink conductor 210 provides services based on a multi-dimensional model depicting the relationships between messages, channels 240, processes 235, private process applications 260, and Enterlink applications 255. While the process engine 220 and the metachannel engine 215 facilitate movement of messages to and from channels or metachannels, respectively, the Enterlink conductor 210 transitions messages from one channel 240 or metachannel 230 to another based on relationships between channels 240, processes, companies, and Enterlink applications 255. By facilitating message transitions between channels 240 and metachannels 230, the Enterlink conductor 210 performs a process routing function.

The following are some examples of applying the Enterlink conductor 210 process routing capability: (1) Tie singular public processes together to form compound public processes; (2) Dynamically route messages between processes based on content or any combination of other relationships; (3) Enable flexible security and privacy segmentation based on data, application, and/or business relationship; (4) Enable changes in a channel 240 or metachannel 230 to be isolated from impacting another channel or metachannel.

6. Enterlink Applications 255, 140

Enterlink applications 255, 140 were described with reference to FIG. 1 above.

7. Private Process Applications 260, 150

Private process applications 260, 150 were described with reference to FIG. 1 above.

8. Connectors 250, 252

The connectors are described in greater detail with reference to FIG. 3 below.

C. Connector Architecture

FIG. 3 illustrates the connector architecture utilized in the Enterlink bus architecture 110 depicted in FIGS. 1 and 2. Another term that is commonly used for connectors is adapters. Messages are written to and read from the channels 240 via publish and subscribe mechanisms known in the art. Companies 134 and their private process applications 150, 260 and Enterlink public process applications 140, 255 use the connector architecture to interact with the Enterlink.

A metachannel connector 250 is unique from a singular process connector 252 in that a metachannel connector 250 provides the ability for Enterlink applications 255 to participate in compound processes. The metachannel connector 250 also allows the Enterlink applications 255 to work with an abstraction of a process, rather than working with the actual process itself. This, in turn, provides Enterlink applications 255 with greater flexibility in working with compound processes.

There are three layers to the connectors 250, 252: 1) an application specific interface 310; 2) a data and process translation layer 315; and 3) an Enterlink bus specific interface 320 or public process interface 330.

The application specific interface 310 exposes a set of data and methods to other applications, commonly called application programming interfaces (API) (not shown). These APIs encapsulate the business rules necessary to move data between the data and process steps between the applications 255, 260, and the channels 240, thus avoiding the need to duplicate these rules in the translation layer 315.

The application specific interface 310 is specific to the technology of the application 255, 260 that is attached to the Enterlink bus 110. For example, this interface 310 would be aware of the application's programming language, DBMS (Data Base Management System), operating system, data schema, and trigger mechanisms.

The translation layer 315 implements data mapping and data translation services. This layer performs specified data conversions from one data format to another. For the Enterlink, data from an application 255, 260 is converted into a common form for a given singular or compound public process. Also the reverse applies when data is taken from the Enterlink and given to an application 255, 260. This layer can be viewed as an abstraction that insulates changes to applications 255, 260 or public process from impacting each other. This results in a far more flexible architecture that can rapidly change to meet future needs as well as insulating existing implementations from being impacted.

The public process interface 330 contains mechanisms to read and write messages to/from singular public process channels 240.

The Enterlink specific interface 320 contains mechanisms to read and write messages to/from the Enterlink bus 110. This interface understands the messages, data formats, timings, and events specific to the Enterlink. There are two types of Enterlink specific interfaces 320: 1) for companies 134, government entities 136, and eMarket exchanges 138 that operate with singular public processes; and 2) Enterlink applications 140 that operate with both singular and compound public processes. The first type of interface is a subset of the second type.

Elements 310, 315, and 330 constitute a singular process connector 252 between channel 240 and application 260, whereas elements 310, 315, and 320 constitute a metachannel connector 250 between metachannel 230 and application 255.

FIG. 4

FIG. 4 illustrates a specific example of the Enterlink topography shown on FIG. 1, as applied to the automotive retail industry, to form an overall federated system for the automotive retail industry.

In FIG. 4, the Enterlink bus 410 provides a common interconnection among various entities in the automotive retail industry, including Enterlink community participants 430 that comprise consumers 432, automotive retail companies 434, government agencies 436 that interface with the automotive retail industry, automotive exchanges 438 and providers 439 of external data. In addition, the Enterlink bus 410 also interconnects Enterlink applications 440, which may include warranty workflow, parts management, service scheduling, service history and inventory management. Furthermore, Enterlink also provides a common interconnection with private process applications 450, which may include a dealer management system, a dealer communication system, a car company's internal system, or a finance company's internal system. Third party services 460 are also made accessible through the Enterlink bus 410, and may include services such as automotive finance, lead management, automotive research, insurance and parts locator. Finally, a common connection is also provided by the Enterlink bus 410 to consolidated data stores 470 such as operational data stores and data warehouse containing information on customer, parts and service.

The Enterlink core services 420 comprise management of company trading agreements, Enterlink application integration, integration of private process applications to public processes, metachannel support and directory, data transformation, and internal business support functions such as monitoring and billing. Using the Enterlink core services 420, an Enterlink community participant 430, such as a consumer 432, can connect to the Enterlink bus and communicate electronically with the other entities that are also connected on the Enterlink bus 410, such as third party providers of automotive financing or insurance.

FIG. 5

FIG. 5 shows the Enterlink bus architecture for the federated system shown on FIG. 4. This is the automobile retail embodiment of the general case shown in FIG. 2. Key architectural components of the bus architecture may include the process engine 520, the Enterlink conductor 510, the metachannel engine 515, the channels 540, the Enterlink compound processes 535, and the metachannels 530.

The Enterlink applications 555 comprise such applications as warranty workflow, parts management, and service scheduling. The Enterlink applications 555 utilize connectors 550 to exchange electronic data with metachannels 530. The channels 540 interact with the process engine 520 to process singular public processes. A process model 525 supports the process engine 520 by supplying the steps that are required to process messages. The process engine 520 interacts with the channels 540 to facilitate movement of messages between process steps.

The metachannel engine 515 provides the ability to exchange messages between Enterlink applications 555 and singular public process channels 540, through metachannels 530. The metachannel repository 570, as noted above, depicts the relationships between messages, channels 540, processes, companies, and Enterlink applications 555.

On the other hand, private process applications 560 comprise such applications as can be found in various automotive dealers, as well as applications used by automotive manufacturers and state departments of motor vehicles. The processing of messages in the private process applications 560 mirror the processing of messages in the Enterlink applications 555. The private process applications 560 utilize connectors 550 to exchange messages with channels 540. The channels 540 interact with the process engine 520 to process singular public processes. A singular process model 525 supports the process engine 520 by supplying the steps that are required to process messages in the singular public process. The process engine 520 interacts with the channels 540 to facilitate movement of messages between process steps.

FIG. 6

FIG. 6 illustrates the Enterlink connector architecture for the automotive retail setting shown on FIGS. 4 and 5 and is a specific embodiment of FIG. 3. Messages are written to and read from channels 540 and metachannels 530 using methods that are known in the art. The Enterlink application 555 (a warranty workflow in this example) and the company information system 560 (a dealer management system in this example) utilize the connector architecture to interact with Enterlink. When the company information system 560 writes messages to the singular public process channels 540, the application specific interface 610 first receives the message. Using the business rules contained within the application specific interface 610, the message is transmitted to the data and process translation services 615. In the translation services 615, the message is mapped and translated into a format that the channels 540 can use. The translated message is transmitted to the public process interface 630, before the message is written into the channels 540.

The flow of the message from the channels 540 to the company information system 560 when a message is read from the channels 540 follows the reverse of the message flow just described when a message is written to the channels 540. The message is received from the channels 540 to the public process interface 630. The message is transmitted to the data and process translation services 615, where it is mapped and translated to a format that the company information system 560 can use. The message is then transmitted to the application specific interface 610, which is aware of the system environment in which the application operates, including the application's programming language, operating system, DBMS, data schema and trigger mechanisms.

Using this familiarity with the application 560, the application specific interface 610 forwards the message to the company information system 560.

Just as messages can be written to and read from singular public process channels 540, so too can messages be written to and read from the metachannels 530 and Enterlink compound processes 535. When the Enterlink application 555 (such as the warranty workflow) writes messages to the metachannels 530, the application specific interface 610 first receives the message. Using the business rules contained within the application specific interface 610, the message is transmitted to the data and process translation services 615. In the translation services 615, the message is mapped and translated into a format that the metachannels 530 can use. The translated message is transmitted to the Enterlink specific interface 620, before the message is written into the metachannels 530.

When messages are read by the Enterlink application 555 from the metachannels 530, the message flow follows the reverse of the preceding message flow. The message is received from the metachannels 530 to the Enterlink specific interface 620. The message is transmitted to the data and process translation services 615, where it is mapped and translated to a format that the Enterlink application 555 can use. The message is then transmitted to the application specific interface 610, which is aware of the system environment in which the Enterlink application 555 operates, including the application's programming language, operating system, DBMS, data schema and trigger mechanisms. The application specific interface 610 finally forwards the message to the Enterlink application 555.

Elements 610, 615, and 630 constitute a singular process connector between channel 540 and DMS 560; while elements 610, 615, and 620 constitute a metachannel connector between metachannel 530 and Enterlink application 555.

FIG. 7

A highly simplified example of the infrastructure for the core Enterlink, companies, and Enterlink applications is shown in FIG. 7. Note that for an actual implementation for a vertical industry (such as the automotive retail industry) the number of companies would be in the order of tens of thousands, hundreds of Enterlink applications, and several core Enterlink data centers. For a vertical industry, this arrangement could equate to hundreds or thousands of computers.

An example illustrating the infrastructure (i.e., computing hardware, operating systems, and networking) needed for the Enterlink is highly flexible depending on the industry it is being applied to and specific design tradeoffs. The infrastructure has three domains. They are the Enterlink applications 710, a company's information systems 720, and core systems of the Enterlink 730.

Depending on the vertical industry type, geographical distribution of the companies, and international considerations, the infrastructure design will vary widely. In general, the core Enterlink infrastructure 730 will be consolidated and replicated in several data centers based on geographic and availability considerations. The core Enterlink infrastructure 730 is segmented into four groupings of computers. One set 732 is for process control and connectors and uses the process models 733. One set 734 is for the metachannel engine and uses the metachannel repository 735. One set 736 is for applications that allow users to interact with the Enterlink to conduct business as well as monitor the health and status of the systems. One set is for the Enterlink Conductor 731. The number of systems will be driven by scaling considerations.

The Enterlink applications infrastructure 710 will either co-reside at the same facilities as the core Enterlink computers 731, 732, 734, 736 or be at another location determined by the Enterlink application provider. The determination will be made when designing the implementation based on networking bandwidth cost tradeoffs and infrastructure capabilities at the Enterlink application provider. The Enterlink applications domain 710 may include distributed Enterlink applications servers 712, metachannel connectors 714, and centralized Enterlink application servers 716.

The company infrastructure 720 may include company systems with connectors on a separate server 722, singular public process connectors 724, and company systems with co-resident connectors 726, communicating with the Enterlink domains 710, 730 through the Internet 740, or otherwise.

The Company connector infrastructure 252 will be either distributed at the company 720 or centralized. Centralized options include placing the connector infrastructure with the Enterlink core infrastructure 730 or at a location determined by one or more companies. The determination will be made when designing the implementation based on costs tradeoffs (i.e., bandwidth and infrastructure support) and company autonomy considerations.

The servers within each domain 710, 720, 730 may communicate through LAN's, WAN's, intranets, or other network types.

D. Enterlink Core Services 120, 420

FIG. 8 illustrates the Enterlink core services 120, 420 as depicted in FIGS. 1 and 4.

1. Presentation 810

The purpose of the presentation services 810 is two-fold: (1) to provide the mechanisms and tools to view externally the information enabled by the Enterlink and (2) to provide the mechanisms and tools to view the internal workings of the Enterlink itself. Some of the more common external services are navigation 812 and multi-casting 814. Navigation 812 is needed to abstract the core services so that one can conduct business without having to know the specific details of where data and services are located. Another key capability of the navigation service 812 is the ability to search, such as when seeking specific data that are enabled by the Enterlink. Multi-casting services 814, on the other hand, are broadcast services that deliver information to a user, such as a ticker on a user screen, email broadcasts, and asynchronous request/reply.

As has been noted above, the presentation services 810 also provide the mechanism and tools to view the internal workings of the Enterlink. The presentation service allows Enterlink personnel to perform maintenance and other operations on the Enterlink configuration.

2. Connectivity 820

There are three key connectivity 820 components: connections 822 to businesses and users, interfaces 824 via the connectors, and physical networking 826. The model that is often used to describe the needed connections 822 to businesses and users is a very large "switch" that routes a message from any point to any point in real time. In the context of the Enterlink, these connections are preserved and augmented with new capabilities. Layered on top of the network switch is a set of components that add intelligence and coordination to the movement of messages or data. This is performed in a manner that abstracts across enterprise business processes from each enterprise's physical systems. This "loosely connected" model provides great flexibility to the various participants 130 to allow the participants 130 to make changes rapidly to their own physical systems with minimal or no impact on each other.

The connectors 250, 252 are the components that link an application to the Enterlink bus 110. The connector model allows for a high degree of reuse. The process interface 824 may be built once and reused across all the systems. The data and process translation is built once and the intelligence for translation is dynamically driven. The data (i.e., the metadata) that drive the translation are developed incrementally as new applications and services become available. The metadata are managed by a distributed collaboration between the connectors. This is in contrast with traditional approaches where translation is performed in code that can literally result in millions of hard coded translations.

The physical networking 826 consists of a variety of connections, such as the Internet, frame relay, and point-to-point lines. The preferred connection type optimizes the network to deliver services to a participant 130 from that participant's perspective, while also supporting the federated architecture where there will be predictable traffic patterns dependent on the Enterlink bus partitioning.

3. Workflow 830

Workflow services 830 include asynchronous transactions 832, which allow two or more parties to conduct business without the need to negotiate and schedule rigid time windows. This is similar in concept to communication between two persons by email, where the person sending the email does not need to negotiate and schedule a time window during which to send the email to another person. In contrast, for example, communication between two persons by phone requires that both persons are on the phone at the same time.

Another example of workflow services 830 is aggregation/de-aggregation services 834, which combine several transactions into one, or conversely, break a transaction into several parts. Aggregation is needed when two or more events need to be handled before an action is taken. For example, the events "PARTS ARE AVAILABLE" and "WARRANTY APPROVED" must be aggregated before the event "CALL CUSTOMER TO SCHEDULE REPAIR" can be performed. Conversely, events are de-aggregated when, for example, a dealer finishes a repair. One message is sent to the Enterlink, and the Enterlink sends two messages: one message that is specific to the original equipment manufacturer (OEM), and another message that is specific to the consumer.

4. Data Services 840

Data services 840 include transformation services 842. There are several layers of transformation. The lower, more physical, levels take care of detailed element conversions which is often a labor-intensive, business-specific activity. What the Enterlink offers is a robust set of services to facilitate the process and implement the results. The participants 130 will perform the actual definition of the conversions. The higher levels of transformations include enabling semantic mapping services. For example, given the widespread adoption of Extensible Markup Language (XML), there are numerous competing document type definitions (DTD's) being developed. The Enterlink facilitates the translations of these descriptions.

In addition to translating data among various participants, the Enterlink also provides mapping services. Enterlink can map data fields and processes to enable Enterlink participants 130 to interact with each other.

5. Hosting 850

Hosting services 850 are services that relate to the maintenance and upkeep of the Enterlink applications. Enterlink uses an application service provider (ASP) 852 model to deliver computing capability with one physical system that may be logically partitioned. In addition, help desk services 854 are also provided to support the users of the federated system.

6. Management 860

The Enterlink provides basic back office systems management 862, billing systems 864, as well as security and privacy systems 866. Enterlink also provides a billing system 864 integrated with services, transactions, and consulting that have been delivered to Enterlink customers. In addition, security systems 866 are provided that enable appropriate control, monitoring, and auditing of the Enterlink.

The security services are key to the viability of the Enterlink to enable private and Enterlink applications to integrate together into an overall federated system. In many cases, these applications sometimes need to communicate with each other, and at other times, be totally isolated (i.e., secured) from each other. A key component that accomplishes this level of security is the Enterlink conductor 210. It contains a repository that specifies at a granular level what interactions are allowed under what circumstances. The Enterlink itself also provides basic security services. Examples of these services are monitoring, auditing, intrusion detection and correction.

While the present invention has been described in connection with what are presently considered to be the most practical and preferred embodiments, it is to be understood that the invention is not limited to the disclosed embodiments. On the contrary, the present invention is intended to cover various modifications and equivalent arrangements included within the spirit and scope of the appended claims.

What is claimed is:

1. A federated system with state comprising:
   a. a bus;
   b. consolidated data stores, connected to the bus;
   c. means for core services, connected to the bus;
   d. means for public process applications, connected to the bus;
   e. a plurality of private process connectors, each connected to the bus and each adapted to connect with a private process application of a participant; and
   f. a web connection, connected to the bus and adapted to connect to third party services, wherein the consolidated data stores contain retail automotive industry data including:
   a. an operational data store; and
   b. a data warehouse for automobile service, automobile parts, and automobile customers, the core services include:
   a. management of participant trading agreements;
   b. public process application integration;
   c. integration of private process applications to public processes;
   d. metachannel support and directory;
   e. data transformation; and
   f. internal business support functions, including monitoring and billing, the public process applications include:
   a. a warranty workflow application;
   b. a parts management application;
   c. a service scheduling application;
   d. a service history application; and
   e. an inventory management application, the private process connectors include:
   a. a dealer management system connector;
   b. a dealer communication system connector;
   c. an automobile manufacturer internal system connector; and
   d. a finance company internal system connector, the participants include:
   a. automobile consumers;
   b. automobile manufacturers;
   c. government entities;
   d. automobile exchanges; and
   e. external data suppliers, the connectors comprise:
   a. an application specific interface;
   b. a translation layer; and
   c. an interface specific to the bus, the third party services comprise:
   a. automotive finance;
   b. lead management;
   c. automotive research;
   d. insurance; and
   e. parts locator, and the bus comprises
   a. a physical bus, with a plurality of channels;
   b. a metachannel for connecting channels to each other;
   c. a plurality of compound processes that interact with the plurality of channels and the metachannel;
   d. a process engine to facilitate the reading of messages from, and the writing of messages to channels;
   e. a metachannel engine to control the interactions with the metachannel;
   f. a metachannel repository that stores process services available to a plurality of applications;
   g. a singular process model to identify the steps to be taken by a singular public process engine for processing a singular public process; and
   h. a conductor that interacts with the compound processes to process the messages.

2. A federated system with state comprising:
   a. a bus;
   b. consolidated data stores, connected to the bus;
   c. means for core services, connected to the bus;
   d. means for public process applications, connected to the bus;
   e. a plurality of private process connectors, each connected to the bus and each adapted to connect with a private process application of a participant; and
   f. a web connection, connected to the bus and adapted to connect to third party services.

3. The system in claim 2 where the consolidated data stores contain retail automotive industry data including:
   a. an operational data store; and
   b. a data warehouse for automobile service, automobile parts, and automobile customers.

4. The system in claim 2, where the core services further include:
   a. management of participant trading agreements;
   b. public process application integration;
   c. integration of private process applications to public processes;
   d. metachannel support and directory;
   e. data transformation; and
   f. internal business support functions, including monitoring and billing.

5. The system in claim 2, where the public process applications include:
   a. a warranty workflow application;
   b. a parts management application;
   c. a service scheduling application;
   d. a service history application; and
   e. an inventory management application.

6. The system in claim 2, where the private process connectors include:
   a. a dealer management system connector;
   b. a dealer communication system connector;
   c. an automobile manufacturer internal system connector; and
   d. a finance company internal system connector.

7. The system in claim 2, where the participants include:
   a. automobile consumers;
   b. automobile manufacturers;
   c. government entities;
   d. automobile exchanges; and
   e. external data suppliers.

8. The system of claim 2 where the third party services comprise:
   a. automotive finance;
   b. lead management;
   c. automotive research;
   d. insurance; and
   e. parts locator.

9. The system of claim 2 where the public process applications are selected from the group comprising automotive retail applications.

10. The system of claim 2, wherein the connectors comprise:
    a. an application specific interface;
    b. a translation layer; and
    c. an interface specific to the bus.

11. The system of claim 2, where the private process application is selected from the group comprising automotive retail applications.

12. The system of claim 2 where the third party services are selected from the group comprising automotive retail services.

13. The system of claim 2 where the participant are selected from the group comprising participants in the automotive retail industry.

14. The system of claim 2 where the consolidated data store is selected from the group comprising data sources used in the automotive retail industry.

15. The system of claim 2 where the public processes comprise singular public processes and compound public processes.

16. The system of claim 2 where the private process applications read messages from and write messages to channels.

17. The system of claim 2, wherein the bus further comprises a metachannel for connecting channels to each other.

18. The system of claim 2, wherein the bus further comprises a plurality of compound processes that interact with a plurality of channels and a metachannel.

19. The system of claim 2, wherein the bus further comprises a process engine to facilitate the reading of messages from, and the writing of messages to channels.

20. The system of claim 2, wherein the bus further comprises a metachannel engine to control the interactions with a metachannel.

21. The system of claim 2, wherein the bus further comprises a metachannel repository that stores process services available to a plurality of applications.

22. The system of claim 2, wherein the bus further comprises a singular process model to identify the steps to be taken by a singular public process engine for processing a singular public process.

23. The system of claim 2, wherein the bus further comprises a conductor that interacts with a plurality of compound processes to process messages.

24. The system of claim 2, wherein the core services comprise presentation, connectivity, workflow, data, and hosting.

25. A bus comprising
    a. a physical bus, with a plurality of channels;
    b. a metachannel for connecting channels to each other;
    c. a plurality of compound processes that interact with the plurality of channels and the metachannel;
    d. a process engine to facilitate the reading of messages from, and the writing of messages to channels;
    e. a metachannel engine to control the interactions with the metachannel;
    f. a metachannel repository that stores process services available to a plurality of applications;
    g. a singular process model to identify the steps to be taken by a singular public process engine for processing a singular public process; and
    h. a conductor that interacts with the compound processes to process the messages.

* * * * *